United States Patent
Chen et al.

(10) Patent No.: US 11,078,555 B2
(45) Date of Patent: Aug. 3, 2021

(54) AUSTENITIC, LOW-DENSITY, HIGH-STRENGTH STEEL STRIP OR SHEET HAVING A HIGH DUCTILITY, METHOD FOR PRODUCING SAID STEEL AND USE THEREOF

(71) Applicant: TATA STEEL NEDERLAND TECHNOLOGY B.V., Velsen-Noord (NL)

(72) Inventors: Shangping Chen, Beverwijk (NL); Arunansu Haldar, Kolkata (IN); Alireza Saeed-Akbari, Lucerne (CH); Richard Mostert, Heemskerk (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 249 days.

(21) Appl. No.: 16/078,081

(22) PCT Filed: Feb. 28, 2017

(86) PCT No.: PCT/EP2017/054564
§ 371 (c)(1),
(2) Date: Aug. 21, 2018

(87) PCT Pub. No.: WO2017/148892
PCT Pub. Date: Sep. 8, 2017

(65) Prior Publication Data
US 2019/0055622 A1    Feb. 21, 2019

(30) Foreign Application Priority Data

Mar. 1, 2016    (EP) .................................... 16157977

(51) Int. Cl.
*C22C 38/02*    (2006.01)
*C22C 38/00*    (2006.01)
(Continued)

(52) U.S. Cl.
CPC ................ *C21D 9/52* (2013.01); *B32B 15/01* (2013.01); *C21D 6/004* (2013.01); *C21D 6/005* (2013.01);
(Continued)

(58) Field of Classification Search
CPC ....................................................... C21D 9/46
See application file for complete search history.

(56) References Cited

U.S. PATENT DOCUMENTS 6,387,192 B1    5/2002    Frommeyer et al.
2013/0295409 A1*    11/2013    Chin .................... C23C 2/28
                                                              428/653
(Continued)

FOREIGN PATENT DOCUMENTS

CN    105339519 A    2/2016
EP    0889144 A1    1/1999
(Continued)

OTHER PUBLICATIONS

Oka et al., JP-2006176843-A, machine-generated English language text (Year: 2020).*
(Continued)

*Primary Examiner* — Anthony J Zimmer
*Assistant Examiner* — Michael J Kachmarik
(74) *Attorney, Agent, or Firm* — Vorys, Sater, Seymour and Pease LLP (57) ABSTRACT

An austenitic, low-density, high-strength steel strip or sheet having a high ductility, and a method of producing the steel strip or sheet, and for its use.

20 Claims, 4 Drawing Sheets (51) Int. Cl.
| | |
|---|---|
| C21D 9/52 | (2006.01) |
| C21D 9/46 | (2006.01) |
| C21D 8/02 | (2006.01) |
| C21D 6/04 | (2006.01) |
| C21D 6/00 | (2006.01) |
| C23C 2/40 | (2006.01) |
| C22C 38/06 | (2006.01) |
| C22C 38/42 | (2006.01) |
| C22C 38/46 | (2006.01) |
| C22C 38/48 | (2006.01) |
| C22C 38/50 | (2006.01) |
| C22C 38/58 | (2006.01) |
| C22C 38/04 | (2006.01) |
| C22C 38/40 | (2006.01) |
| C22C 38/20 | (2006.01) |
| C22C 38/28 | (2006.01) |
| C22C 38/38 | (2006.01) |
| C22C 38/26 | (2006.01) |
| C22C 38/24 | (2006.01) |
| C23C 2/12 | (2006.01) |
| C23C 2/06 | (2006.01) |
| C23C 2/28 | (2006.01) |
| C23C 2/02 | (2006.01) |
| C22C 38/44 | (2006.01) |
| B32B 15/01 | (2006.01) |
| C25D 3/56 | (2006.01) |

(52) U.S. Cl.
CPC ............. *C21D 6/008* (2013.01); *C21D 6/04* (2013.01); *C21D 8/0205* (2013.01); *C21D 8/0226* (2013.01); *C21D 8/0236* (2013.01); *C21D 8/0247* (2013.01); *C21D 8/0273* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/20* (2013.01); *C22C 38/24* (2013.01); *C22C 38/26* (2013.01); *C22C 38/28* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *C23C 2/02* (2013.01); *C23C 2/06* (2013.01); *C23C 2/12* (2013.01); *C23C 2/28* (2013.01); *C23C 2/40* (2013.01); *C25D 3/565* (2013.01); *C21D 2211/001* (2013.01); *C21D 2211/004* (2013.01); *C21D 2211/005* (2013.01)

(56) References Cited

U.S. PATENT DOCUMENTS

2016/0145706 A1* 5/2016 Chung .................... C22C 38/06
148/603
2016/0319388 A1* 11/2016 Kim ..................... C21D 8/0226

FOREIGN PATENT DOCUMENTS

| EP | 2653581 A2 | | 10/2013 |
|---|---|---|---|
| JP | 2006176843 A | * | 7/2006 |
| JP | 2006176843 A | * | 7/2006 |
| JP | 2006176843 A | | 7/2006 |
| KR | 20150075501 A | | 7/2015 |

OTHER PUBLICATIONS

Translated copy of JP 2006176843 (Year: 2006).*
International Search Report and Written Opinion dated May 15, 2017 for PCT/EP2017/054564 to Tata Steel Nederland Technology B.V. filed Feb. 28, 2017.
Notification of Transmittal of the International Preliminary Report on Patentability dated May 15, 2018 for PCT/EP2017/054564 to Tata Steel Nederland Technology B.V. filed Feb. 28, 2017.
A. Saeed-Akbari; A. Schwedt; W. Bleck, "Low stacking fault energy steels in the context of manganese-rich iron-based alloys", Scripta Mater., (2012), vol. 66, No. 12, doi:doi:10.1016/j.scriptamat.2011.12.041, pp. 1024-1029, XP028481809.

* cited by examiner

AUSTENITIC, LOW-DENSITY, HIGH-STRENGTH STEEL STRIP OR SHEET HAVING A HIGH DUCTILITY, METHOD FOR PRODUCING SAID STEEL AND USE THEREOF

FIELD OF THE INVENTION

This invention relates to an austenitic, low-density, high-strength steel strip or sheet having a high ductility, to a method of producing said steel strip or sheet, and to its use.

BACKGROUND OF THE INVENTION

Recently, demand for high-strength automotive parts has markedly increased to allow for reductions in the weight of automobiles for low emissions and good gas mileage as well as to improve the impact safety of automobiles. To this end, high-ductility, high-strength steel sheets have been developed. However, there is a limit to decreasing the weight of automobiles through the use of the abovementioned high-ductility, high-strength steel sheets. Therefore, it is necessary to use lightweight materials such as steel sheets having a low specific gravity to additionally decrease the weight of automobiles. Such steel sheets have a low specific gravity have very high values for strength and ductility but are relatively inexpensive as compared with rival materials, and are thus considered as a substitute that can satisfy market demand. Aluminium alloys having a low density can be considered in comparison with the steel material for achieving weight reduction. However, the ductility, workability and weldability of aluminium alloys are generally inferior to those of steel. Advanced high strength steels (AHSS) such as dual phase (DP) steels and transformation induced plasticity (TRIP) steels are currently typical of high-ductility, high-strength steels used for automobiles. Si, Mn, P, Al and B are added to form a structure comprising bainite and at most 10% retained austenite, thereby increasing the tensile strength to 500-700 MPa. However, due to the difference of the deformation capabilities between the bainite structure and the retained austenite structure, the formability is lowered, and therefore, this material is limitedly used in automobile parts which do not require a high formability. Strength and ductility are obtained in such steels by including martensite or retained austenite in ferrite. Such steels are subject to deformation by the mechanism of dislocation glide and are limited to having good ductility at high strength due to interfaces between different types of microstructure. Twinning induced plasticity (TWIP) steel including 15% or more of Mn is also proposed as a high-ductility, high-strength steels for automotive parts. TWIP steels have a single-phase austenite microstructure and highly improved strength-ductility characteristics but a low yield strength at a yield ratio of 40% to 60%, and is thus difficult to be provided with sufficient rigidity for automotive structural parts. TWIP steels also have a problem with delayed fracture caused by hydrogen absorption after processing. Moreover, the density of the high Mn containing steels is not significantly reduced compared with AHSS. Recently, high-strength, high-ductility steel sheets having a low specific gravity, owing to the addition of a light element such as aluminium, have been developed. A typical example is disclosed in EP0889144 wherein an austenitic steel sheet is formed by adding 8% or less of Al and 10% to 30% of Mn to low carbon steel. Since the disclosed steel sheet has a very low carbon content (present as a tramp element only), a large amount of Mn is added to stabilize austenite therein. However, when the disclosed sheet is deformed, austenite may easily be transformed into martensite thereby decreasing ductility. JP2006-176843 discloses a high-strength and low-density steel sheet superior in ductility comprises with a structure comprising 90% austenite or more, ferrite of 5% or less, and a (Fe,Mn)3AlC phase of 1% or less with a specific gravity of less than 6.8, a tensile strength of 700 MPa or higher and an elongation of 50% or more.

SUMMARY OF THE INVENTION

The object of the invention is to provide an austenitic, lightweight, high-strength steel sheet including appropriate concentrations of alloying elements such as Mn, Si, and Al having a yield ratio (YS/UTS) of at least 0.60.

It is also an object of the invention to provide a method for producing an austenitic, lightweight, high-strength steel sheet including appropriate concentrations of alloying elements such as Mn, Si, and Al having a yield ratio (YS/UTS) of at least 0.60.

The object of the invention is reached by providing an austenitic, low-density, high-strength steel strip or sheet having a high ductility, comprising (in wt. %):
0.65-1.2% C;
0-0.5% Si;
5.0-20.0% Mn;
5.5-11.0% Al;
0.001-0.05% N;
0.02% or less P;
0.02% or less S;
optionally one or more of:
0.001-0.01% Ca;
0.01-0.2% Ti;
0-5.0% Cr;
0-10.0% Ni;
0-2.0% Cu;
0-1.0% Mo;
0-0.5% V;
0-0.2% Nb;
0-0.2% Zr;
0-0.0050% B;
0-0.2% Sb;
the balance Fe with unavoidable impurities, having a microstructure comprising (area %) 70% to 100% of austenite, 30 to 0% of ferrite, and 0 to 5% (area %) of a κ-$(Fe,Mn)_3AlC$-carbide phase having a yield ratio (YS/UTS) of at least 0.60, and a ratio of Mn/Si>40. The object is also reached by the method for producing the said steel.

The reduced density is realized by adding the required amounts of Al and Mn. The high strength and high ductility are realized by producing austenite based microstructure. The austenite based microstructure is obtained by adding a large amount of Mn and C. TRIP and/or TWIP effect are activated by adjusting the SFE (stacking fault energy) of the austenitic base through controlling the ratio between Mn, C and Al to produce high ductility. A nano structured twinning-induced plasticity (TWIP) steels can be obtained by cold rolling and recovery treatment. A controlled amount of κ-$(Fe,Mn)_3AlC$-carbides can be introduced to produce precipitation hardening by proper annealing process and/or a controlled amount of martensite can be introduced to increase the strength by applying cryogenic deep cooling treatment.

DETAILED DESCRIPTION

The effect of the alloying elements and the justification for the chosen ranges will now be described.

Aluminium (Al) is an important element together with C and Mn in the steel according to the invention. The main purpose of the addition of Al is to lower the density of steel to the targeted levels. The addition of 1 wt % of Al brings about 1.2% reduction in density. Moreover, Al has a large solubility in steel and the atomic radius of Al is much different from that of Fe, so Al increases the yield strength of steel through solution hardening. Al is an element having the most influence on increasing the stacking fault energy of steel as well as changing the twin's internal structure. The content of Al can be adjusted to change the SFE value to the levels required for the activation of different deformation mechanisms in the low-, medium-, and high-SFE regimes. Al can form κ-carbides $(Fe,Mn)_3Al$ to produce the precipitation hardening effect. That is, Al is an important element for controlling the strength and work hardening behaviour of the steel sheet of the present invention. Taking into consideration the decrease in specific gravity, it is preferred that a great quantity of Al be added, however, the addition of an excessive amount of Al increases the amount of intermetallic compounds such as $(Fe,Mn)_3AlC$ to markedly decrease the ductility of steel. Therefore, the concentration of Al must be within the range of 5% to 11%. A suitable minimum value for aluminium is 5.5%. A suitable maximum value is 9.9%.

Carbon (C) is utilized to stabilize austenite, to increase stacking fault energy and to induce dynamic strain aging. When the concentration of C is increased, ductility can be increased even though the yield ratio may be slightly decreased. If the concentration of C is very high and exceeds the solubility limit of carbon in the austenite, $(Fe,Mn)_3AlC$-carbides are excessively precipitated, thereby deteriorating the elongation and formability. Further, if its content is over 1.5 wt %, the stacking fault energy becomes too high, with the result that no twins can be formed. Therefore the concentration of C must be within the range of 0.5% to 1.2% for stabilizing austenite, guaranteeing tensile strength by forming nano-sized $(Fe,Mn)_3AlC$ precipitates, and improving ductility. A suitable minimum value for carbon is 0.65%. A suitable maximum value is 0.9%.

Manganese (Mn), together with C, is an element necessary for thermally stabilizing austenite and increasing stacking fault energy. In addition, Mn increases the lattice constant of steel to decrease the density of the steel. Since a large amount of Al is added to the invented steel to decrease the density and to increase the yield ratio of the steel, the stacking fault energy of the steel may be excessively increased. Therefore, the concentration of Mn must be between 5% and 25% so as to ensure thermal stability of austenite and to adjust the stacking fault energy.

Silicon (Si) is an element added to deoxidize. Like Al, Si decreases the specific gravity of steel and increases the strength and stacking fault energy of steel, but decreases the dynamic strain aging of steel and deteriorates the weldability. If its content is over than 0.5%, the deoxidizing effect is saturated, and moreover, a relatively thick high-temperature oxide layer may be unevenly formed on the steel to decrease the ductility of the steel and coatability. The ratio of Mn/Si in steel must be larger than 40 to secure good coatability. The maximum allowable silicon content is 0.5%. A suitable minimum value for silicon is 0.01%. A suitable maximum value is 0.3, preferably 0.2, more preferably at most 0.15% and even more preferably at most 0.09.

During solidification of a slab, phosphorus (P) segregates along columnar or equi-axed grain boundaries to make the slab brittle at high temperatures and at room temperature and may cause cracks in the slab. In addition, after processing, P increases the ductility-brittleness transition temperature of steel, and makes steel sensitive to hydrogen brittleness. Therefore, the concentration of P should be 0.02% or less.

Sulphur (S) causes high-temperature brittleness as P does and forms inclusions such as MnS, thereby causing fractures when a steel sheet is hot-rolled or cold-rolled. Therefore the concentration of S should be controlled to as low a value as possible, and should be 0.015% or less.

At high temperatures, titanium (Ti) combines with nitrogen (N) to form TiN to suppress the generation of AlN in steel, and at mid-range temperatures, Ti forms TiC to increase the yield strength of steel. However, if a large amount of Ti is added, continuous casting nozzles may be clogged or inclusion defects may occur due to excessive crystallization of TiN. Therefore, if added, the concentration of Ti must be within the range of 0.01% to 0.2%.

A relatively large amount of nitrogen (N) is dissolved in austenite steel to stabilize the austenite structure. The nitrogen precipitates as aluminium-nitride in reaction with Al in the solidification stage, during the hot rolling stage, and during the annealing stage after the cold rolling, and thus, performs a key role in producing twins during the press forming of steel sheets, thereby improving the formability and strengths. However, since a large amount of Al is added in the steel according to the invention, there is a danger that AlN is formed in the molten steel and clogs the continuous casting nozzles or cause inclusion defects, and a large amount of AlN may contribute to crack formation in the cast slab. Precipitation of AlN may also decrease the ductility of the steel. Therefore, the concentration of N must be 0.02% or less. A suitable minimum value for nitrogen is 0.002% (20 ppm). A suitable maximum value is 0.012% (120 ppm). Preferably the nitrogen content is at most 0.009% (90 ppm).

Calcium (Ca) is usually added to steel to remove S. Ca forms coarse sulphides such as CaS to improve hot rolling properties of steel. However, if a large amount of Ca is added, the concentration of Ca in the steel may become excessive to reduce the toughness of the steel. Therefore, the concentration of Ca, if added, must be in the range of 0.001% to 0.01%.

Chromium (Cr), having a function of reducing stacking fault energy, may be added to high-Al steel to adjust stacking fault energy. Cr is also a ferrite forming element. In addition, since Cr improves the corrosion resistance of steel, Cr suppresses absorption of hydrogen when steel corrodes. However, if the concentration of Cr is excessive, Cr-carbide may be formed to reduce the ductility of steel. Therefore, the concentration of Cr must be in the range of 0 to 3.0%. A suitable maximum value is 0.14%. Preferably the chromium content is at most 0.09%.

Like Mn, nickel (Ni) is an element suitable for the purpose of the present invention because Ni stabilizes austenite and increases stacking fault energy. However, since Ni is relatively expensive, C and Mn are used in the present invention instead of Ni. In addition, since Ni added to steel concentrates on the surface of the steel to improve the corrosion and oxidation resistance of the steel, Ni reduces scale or scale defects during a hot rolling process, improves adhesion of plating, and suppresses absorption of hydrogen during corrosion. Therefore, the concentration of Ni must be in the range of 0 to 10.0%. If added as an alloying element, a suitable minimum value for nickel is 0.05%. A suitable maximum value is 6.0%. If not added as an alloying element, then the nickel content is present at most at impurity level.

Like Ni, copper (Cu) stabilizes austenite and increases stacking fault energy. Cu is inexpensive as compared to Ni. Therefore, Cu is suitable for the purposes of the present invention. However, if the concentration of Cu is excessively high, Cu exists as liquid on grain boundaries at a high temperature to cause boundary brittleness and saw-tooth defects on a rolled steel sheet. Therefore, the concentration of Cu must be in the range of 0 to 2.0%. If added as an alloying element, a suitable minimum value for copper is 0.05%. A suitable maximum value is 0.5%. Preferably the copper content is at most 0.4%, more preferably at most 0.34%.

Like Cr, molybdenum (Mo) is a ferrite forming element. In addition, Mo has an influence on thermal stability of austenite and forms micro-carbides to increase the strength of steel. However, Mo is expensive, and a high concentration of Mo decreases the ductility of steel. Therefore, the concentration of Mo must be in the range of 0 to 0.5%. A suitable maximum value is 0.14%. Preferably the molybdenum content is at most 0.09%, more preferably at most 0.04%. If not added as an alloying element, then the molybdenum content is present at most at impurity level.

Vanadium (V) is an element effective in increasing the strength of steel by forming carbonitrides in the steel. However, during solidification, V precipitates on grain boundaries to cause cracks in a slab, and during a hot rolling process, V markedly delays solid solution strengthening and recrystallization to increase rolling loads. Therefore, the concentration of V must be in the range of 0 to 0.5%. A suitable maximum value is 0.14%. Preferably the vanadium content is at most 0.09%, more preferably at most 0.04%.

Like V, niobium (Nb) is an element very effective for forming carbonitrides and delaying recrystallization, Nb may be added to steel to increase the strength of the steel. For these effects, the concentration of Nb must be in the range of 0 to 0.2%. A suitable maximum value is 0.14%. Preferably the niobium content is at most 0.09%, more preferably at most 0.04%.

Like Ti, zirconium (Zr) is effective to previously remove N from steel to suppress the formation of AlN. However, Zr is relatively expensive. Therefore, the concentration of Zr must be in the range of 0 to 0.2%. A suitable maximum value is 0.14%. Preferably the zirconium content is at most 0.09%, more preferably at most 0.04%.

In steel boron (B) is more likely to segregate on grain boundaries than P, and thus problems related to the segregation of P can be reduced. However, if the concentration of B in steel is excessive, boron oxide on the surface of the steel decreases wettability during hot dip coating, and/or boron-carbide is formed to reduce the ductility of the steel. Therefore, the concentration of B must be in the range of 0 to 0.0050%, preferably in the range of 0 to 0.0030%.

Antimony (Sb) may be another characteristic element in the present invention. Since Sb segregates on grain boundaries to reduce grain boundary energy and suppresses the generation of $(Fe,Mn)_3AlC$ and diffusion of C or Al along grain boundaries, Sb can reduce removal of surface ingredients in steel caused by oxidation and thus stabilize the surface structure of steel. However, if the concentration of Sb in steel is excessive, the ductility of steel decreases. Therefore, the concentration of Sb is within the range of 0 to 0.2%. It is noted that the value of any of the optional elements may also be zero.

In an embodiment of the invention the amount of the intergranular precipitates of $\kappa$-$(Fe,Mn)_3AlC$-carbides is less than 5% in area. In an embodiment the size of the $\kappa$-$(Fe,Mn)_3AlC$-carbides is at most 100 nm.

In an embodiment of the invention the amount of other carbides, such as $M_7C_3$ is less than 1% in area. The area percentages of the austenite, ferrite, $\kappa$-carbide and $M_7C_3$ are obtained by measuring the phase constituents at the ¼th thickness location of the strips under an optical microscope with a magnification of 200 to 1000 times.

In an embodiment of the invention the steels have a density of less than 7.3 g/cm$^3$.

In an embodiment of the invention the steels have a tensile strength of at least 750 MPa, preferably at least 800 MPa.

In an embodiment of the invention the steels have an elongation (gauge length of 50 mm) of at least 25%.

In an embodiment of the invention the low-density high-strength steel has a (Mn/Si) ratio of at least 50. In an embodiment of the invention the Mn/Si ratio is at least 100, preferably at least 150. A suitable maximum is 750, preferably 500.

Cold rolling can used to produce intensive nano-twins and/or dislocations so that the microstructure was greatly refined. Annealing is employed to produce aging hardening effect by precipitation of $\kappa$-carbides or to improve the ductility by recovery and/or recrystallisation.

The cryogenic treatment on the rolled products (as in the cases of Fe-10Mn-6Al-0.8C (the alloy 25), and Fe-10Mn-6Al-0.7C (the alloy 26) can boost the strength of these steels at the ambient temperature due to their partial transformation to martensite at the lower temperatures. The activation of deformation induced martensitic transformation at the lower temperature provides a more robust strain hardening behaviour which is expected to increase the strength without deteriorating the formability.

Thus the present invention makes use of the characteristics of the austenite based microstructure. By adjusting the relative compositions of the main elements, Al, Mn and C, one or more of the following mechanisms can be used to achieve high strength and high ductility:
1) fully recrystallised austenitic microstructure with fine grain size, with or without $\kappa$-carbide precipitation;
2) Recovered austenitic microstructure with or without $\kappa$-carbide precipitation;
3) Introducing ferrite (less than 30% in area) to produce ordering or intermetallic phase precipitation;
4) Introducing $\varepsilon$ (hcp) or $\alpha'$ martensite (less than 50% in area) to increase strength.

It is preferable that the amount of a' martensite is less than 40% in area.

A method for producing an austenitic, lightweight, high-strength steel strip or sheet having a high ductility, having a high ductility, comprising (in wt. %):
0.65-1.2% C;
0-0.5% Si;
5.0-20.0% Mn;
5.5-11.0% Al;
0.001-0.05% N;
0.02% or less P;
0.02% or less S;
optionally one or more of:
0.001-0.01% Ca;
0.01-0.2% Ti;
0-5.0% Cr;
0-10.0% Ni;
0-2.0% Cu;
0-1.0% Mo;
0-0.5% V;
0-0.2% Nb;
0-0.2% Zr;
0-0.0050% B;
0-0.2% Sb;
the balance Fe with unavoidable impurities, having a ratio of Mn/Si>40; the method comprising:

producing a thick or thin slab by continuous casting, ingot casting or strip casting;

(re-)heating or homogenising the temperature of the slab, ingot or strip to between 1050 and 1250° C.;

hot rolling at a hot-rolling start temperature of more than 1050° C. and a finish rolling temperature of higher than 850° C.;

followed by (1) cooling to a temperature of lower than 200° C. with a cooling rate higher than 1° C./s, preferably higher than 15° C./s, followed by coiling the strip, or (2) cooling to a temperature in the range of 450 to 700° C. with a cooling rate higher than 1° C./s, preferably higher than 15° C./s, followed by annealing the strip at a temperature between 850 and 1100° C., followed by cooling to a temperature of lower than 200° C. with a cooling rate higher than 1° C/s, preferably higher than 15° C./s, followed by coiling. In between the cooling and the annealing of the strip, the strip may have been coiled after cooling and uncoiled just prior to the annealing.

From this coil hot-rolled sheets can be produced.

Optionally, for steel compositions with potential to produce κ precipitation hardening, such as the alloys 16-19, the hot rolled strips can be annealed in a temperature range of 600 to 750° C. for a period of 1 min to 15 hours to stabilize the microstructure and/or to obtain the controlled precipitation hardening of κ-carbides to further increase the strength.

Optionally, for some other compositions, such as the alloys 25 and 26, the hot rolled strips can be cryogenically treated to a sub-zero temperature (i.e. below 0° C.) to obtain the controlled amount of martensite.

It is preferable that the cryogenic treatment is performed in such a way that the hot-rolled strips and cold-rolled strips are cryogenically treated to a temperature lower than −100° C.

Figure 1:
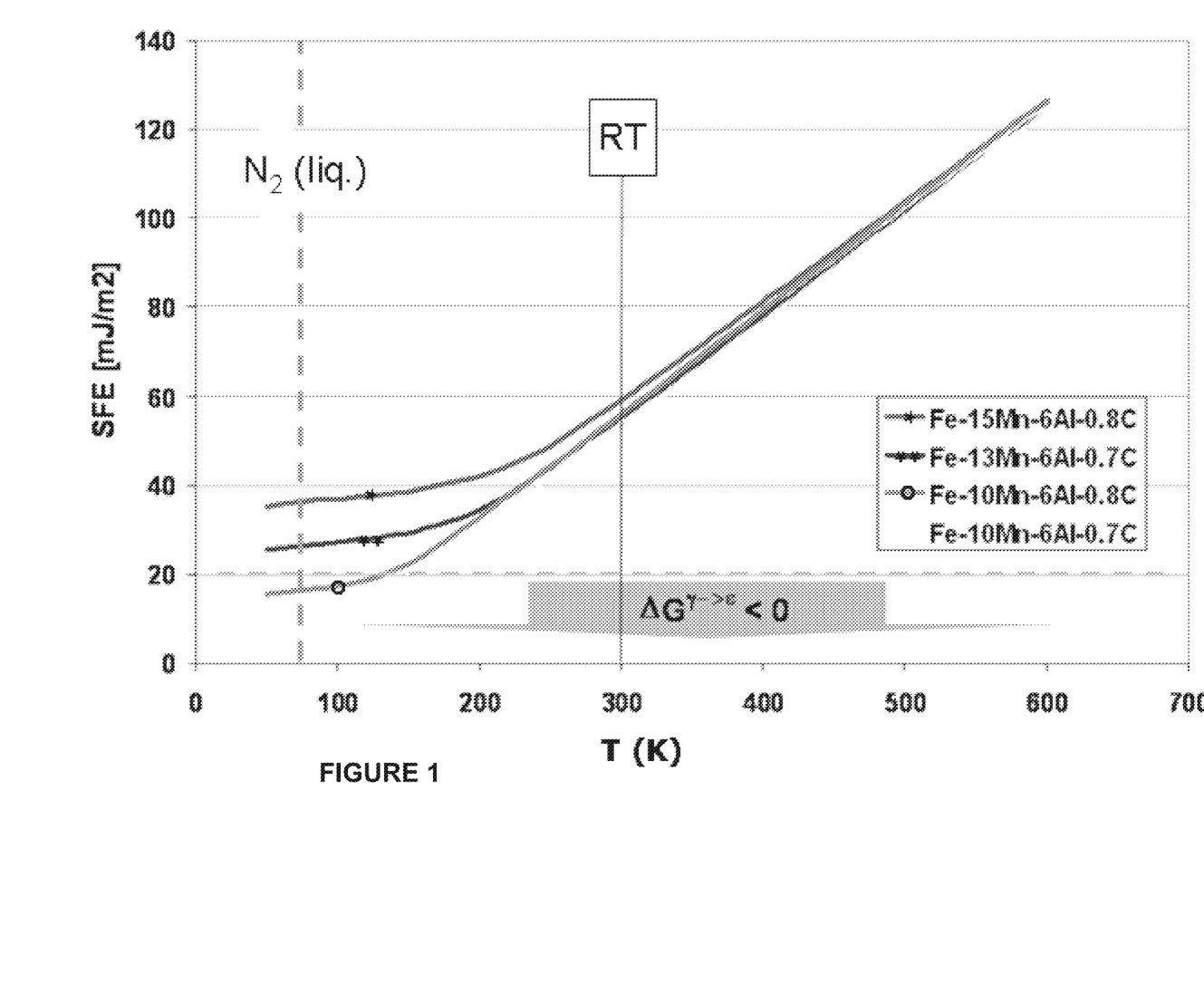
FIG. 1 depicts the stacking fault energy (SFE) vs. temperature for several compositions showing the effect of Mn at low temperatures.

The cryogenic treatment is particularly advantageous for treating hot-rolled strips and cold-rolled strips having a stacking fault energy of less than 20 mJ/m$^2$. In FIG. 1 it is shown that for steels having a manganese content of 10% or below this condition is reached at around 140 K. For a different composition this temperature may be somewhat higher or lower.

The hot rolled strips can be further manufactured as cold rolled products. Normally a pickling step and/or a cleaning step is used to remove the hot-rolled scale.

To produce a cold-rolled product the method further comprises the subsequent steps of:

cold-rolling the coiled steel sheet at a total reduction ratio of 30% to 80%;

after heating the cold-rolled steel sheet at a rate of 1° C./s to 50° C./s to an annealing temperature in the range of 650-1100° C., for 5 seconds to 5 hours;

cooling the annealed steel sheet at a rate of 1° C./s to 100° C./s.

In an embodiment of the invention the annealing temperature is between 650 and 1100° C. to create high strength steels whilst securing adequate ductility.

For steel compositions with potential to produce κ precipitation hardening, the following annealing process is applied.

For creating steels with various combinations of strength and elongation, the annealing is conducted at a temperature higher than the κ-carbide formation temperature to produce the κ-precipitation in the deformed austenitic grains which is the temperature range of 600 to 1100° C. The combination of annealing temperature and annealing time is adjusted to obtain a microstructure with different degrees of recovery or a fully recrystallised microstructure in the austenite matrix. At the same time the shape and the size of the ferritic phase and κ-carbide can be also changed during this annealing process. The microstructure with a lower degree of recovery will provide a relatively high strength but a lower elongation.

If the annealing temperature is below 650° C., recovery and precipitations of the κ- and $M_7C_3$-carbides will occur at the same time. Also, excess amount of $M_7C_3$-carbide precipitates may form in a large size, and therefore, the elongation becomes too low, although the strengths are high. Meanwhile, if the annealing temperature is over 1100° C., austenite grains grow larger than 30 μm and the strength and the elongation is lowered.

The annealing time should preferably be limited to 5 seconds to 5 hours. The higher the annealing temperature is, the shorter the annealing time should be. If the annealing time is less than 5 s, the heat cannot reach to the inner portion of the cold rolled sheet; microstructure through the thickness is not uniform, so that the elongation should be impaired. Meanwhile, if the annealing time exceeds 5 hours, the time limit is violated to form coarse intergranular κ-carbides and/or intergranular α phase and/or coarse austenitic grain size, thereby lowering the strengths and the elongation. The α-phase formed along the γ grain boundaries will transform to B2-ordered ferrite, which is brittle in nature and is not desirable. Preferably the B2-ordered ferrite is not present in the microstructure.

The heating rate during annealing is in the range of 1° C./s to 50° C./s. For continuous annealing treatment, the heating rate is preferably selected to fit the line speed of a standard process line.

The cooling rate after annealing is between 1 and 100° C./s, either to ambient temperatures, or to the galvanizing bath. After galvanizing, the cooling rate is preferably between 5 and 50° C./s, preferably between 10 and 50° C./s.

As to the annealing heat treatment, continuous annealing heat treatment is possible. The cold rolled steel sheet can be also treated with continuous hot-dip galvanizing after cleaning the surface.

To avoid the competition between the restoration processes after cold rolling in austenite (recovery and recrystallisation), the ferritic transformation, and the precipitation phenomena, two-step annealing can be applied; the cold rolled sheets is first heated to a higher temperature for proper period to allow recovery of the dislocations, and subsequently, the steels are cooled down to the appropriate temperature regime for the κ-carbide precipitation to occur.

The heating rate during annealing is in the range of 1° C./s to 50° C./s. For continuous annealing treatment, the heating rate is preferably selected to fit the line speed of a standard process line.

The cooling rate after annealing is between 1 and 100° C./s, either to ambient temperatures, or to the galvanizing bath. After galvanizing, the cooling rate is preferably between 5 and 50° C./s, preferably between 10 and 50° C./s.

As to the annealing heat treatment, continuous annealing heat treatment is possible. The cold rolled steel sheet can be also treated with continuous hot-dip galvanizing after cleaning the surface.

In an embodiment of the invention the hot and cold-rolled strips are cryogenically treated to a sub-zero temperature (cryogenic deep cooling treatment) to obtain the controlled amount of martensite of at most 50%, preferably at most 40%, in area. For steel compositions with potential to introduce martensite for strengthening, the following annealing process may be applied. The hot rolled strips or the cold rolled sheets are annealed at a temperature in the single austenitic area to obtain a fully recrystallised structure with a fine austenitic grain size, i.e. in the temperature range of 850-1100° C. for a short time of 5 s to 30 mins. The annealed sheets are cooled to room temperature at a cooling rate higher than 1° C./s to prevent the formation of carbides, and then are deep cooled (e.g. in liquid $N_2$) to a sub-zero temperature to introduce martensitic transformation. The inventors found that it is beneficial for the steel grade according to the invention to have a stacking fault energy of below 20 mJ/m$^2$ at sub-zero temperatures to introduce martensitic transformation. The temperature dependency of the stacking fault energy is determined using the sub-regular solution thermodynamic model as presented in "Low stacking fault energy steels in the context of manganese-rich iron-based alloys" by A. Saeed-Akbari, A. Schwedt, W. Bleck in Scripta Mater., 2012, Vol. 66, No. 12, pp. 1024-1029. The inventors found that the stacking fault energy of certain steel grades was below 20 mJ/m$^2$ at sub-zero temperatures (see FIG. 1). If the SFE is below 20 mJ/m$^2$, the transformation induced plasticity from the austenite to martensite is believed to be activated by cooling steels in liquid nitrogen or by imposing a mechanical force.

After annealing the steel sheet may be coated, on one or each side, with a metallic coating selected from Zn, Zn—Fe, Zn—Al, Zn—Mg, Zn—Al—Mg, Al—Si, and Al—Mg—Si, wherein the thickness of the coating layer or layers is between 10 and 200 μm. These or other metal coating layers may be applied by a hot dip coating process or an electroplating process.

In an embodiment of the invention a hot rolled steel plate or sheet having a thickness of 2-8 mm is provided. These are predominantly to be used on trucks, buses and other large vehicles, although many other applications can be envisaged.

The slab or strip preparation through casting (i.e. continuous thin or thick slab casting, strip casting or ingot casting) and (re-)heating prior to hot-rolling is performed in a standard manner, i.e. the slab reheating or homogenisation temperature is between 1050 and 1250° C. to dissolve carbides and to homogenize the microstructure.

The roughing stage of the hot rolling process is conducted at temperatures above 1050° C. with a total thickness reduction of higher than 50% to break up the ferrite grains in the area with low Mn and low C contents as a result of the segregation produced during casting.

The finish hot rolling temperature is higher than 850° C. to avoid the formation of κ-carbide during hot rolling.

After hot rolling the strips are cooled to a temperature lower than 200° C. with a cooling rate higher than 1° C./s to avoid the intergranular precipitation of coarse κ-carbides and $M_7C_3$-carbides. Air cooling or spray water cooling can be applied.

Alternatively, the hot-rolled strips are cooled at a cooling rate higher than 1° C./s to a temperature in the range of 450 to 700° C. and coiled. In this case, to further improve the ductility of the hot rolled sheet, from the viewpoint of the grain size and carbide precipitation control, the hot-rolled sheet can then optionally be annealed at a temperature between 850 and 1100° C., and cooled down to a temperature lower than 200° C. with a cooling rate higher than 1° C./s to avoid the intergranular precipitation of κ-carbides and $M_7C_3$-carbides.

The hot rolled steel strip according to the above process should have a austenite based microstructure comprising, by an area percent, austenite of 70% or more to 100%, ferrite of 30% or less to 0%, and a κ-(Fe, Mn)$_3$AlC phase of 5% or less. For steels that could be cryogenically treated, less than 50% martensite, preferably less than 40%, can be introduced from austenite to martensite transformation.

The steels according to the invention preferably have a specific gravity of less than 7.3 g/cm$^3$, more preferably of less than 7.2 g/cm$^3$ and even more preferably of less than 7.0 g/cm$^3$. Preferably the steels according to the invention have a tensile strength of 750 MPa or higher, preferably 800 MPa or higher, and an elongation of 25% or longer, preferably of 30% or longer.

This hot rolled steel sheet can be further cold-rolled and annealed into a cold rolled sheet of below 1.5 mm. This thinner gauge is particularly suited for applications in vehicles, even though the application of the sheet is not restricted thereto.

In the cold rolling, cold rolling reduction is set with a reduction ratio of 30% to 80%. The cold rolling reduction is set to 30% or more to ensure a uniformly deformed microstructure. The upper limit of the cold reduction is restricted to 80% or less in consideration of production efficiency. Optionally, the material may be subjected to intermediate annealing in between cold rolling reductions or steps.

The annealing is conducted to recovery ductility or to obtain recrystallised austenitic grains with required grain size.

To avoid the competition between the restoration processes after cold rolling in austenite (recovery and recrystallisation), the ferritic transformation, and the precipitation phenomena, two-step annealing can be applied; the cold rolled sheets is first heated to a higher temperature for proper period to allow recovery of the dislocations, and subsequently, the steels should be cooled down to the appropriate temperature regime for the κ-carbide precipitation to occur.

For steel compositions with potential to introduce martensite for strengthening, the following annealing process may be applied. The cold rolled sheets are annealed at a temperature in the single austenitic area to obtain a fully recrystallised structure with a fine austenitic grain size, i.e. in the temperature range of 850-1100° C. for a short time of 5 s to 30 mins. The annealed sheets are cooled to room temperature at a cooling rate higher than 1° C./s to prevent the formation of carbides, and then are deep cooled (e.g. in liquid $N_2$) to a sub-zero temperature to introduce martensitic transformation.

After annealing the steel sheet may be coated, on one or each side, with a metallic coating selected from Zn, Zn—Fe, Zn—Al, Zn—Mg, Zn—Al—Mg, Al—Si, and Al—Mg—Si, wherein the thickness of the coating layer or layers is between 10 and 200 μm. These or other metal coating layers may be applied by a hot dip coating process or an electroplating process.

According to a third aspect the invention is also embodied in the use of the steel strip or sheet according to any one of claims 1 to 8 for the production of a part, e.g. a high-strength automotive part, and the use thereof. The steel sheet according to the invention allows a lighter and stronger part to be produced by making use of the lower density and the higher values of the relevant mechanical properties whilst being relatively inexpensive and easy to work with, e.g. with regard to welding.

The invention will now be explained by means of the following, non-limiting, examples.

Example 1

Hot-Rolled Product

Steels having compositions shown in Table 1 were cast. The ingots were reheated at 1200° C. for 2 hours, and then subjected to a first hot-rolling step to 30 mm. These rough rolled slabs were reheated at 1200° C. for 30 min and then hot rolled to 3 mm in 9-10 passes with a finishing rolling temperature of 900° C. and cooled to room temperature either in air or by quenching into water. Tensile tests were performed at room temperature in a 300 kN Denison Mayes servo-hydraulic testing machine following the ISO 6892-1 Standard (small EURO norm samples, gauge length is 50 mm). The tensile properties of the hot rolled strips after various annealing treatments are given in Table 2.

Example 2

Cold-Rolled Product

The hot-rolled steel strips of alloy 18 and 19 were then subjected to cold-rolling at a reduction of 67% from 3 to 1 mm and then annealed at 650° C., 750° C., 800° C. and 850° C., respectively, for various times. The tensile properties of the cold rolled and annealed sheets are given in Table 3.

The microstructures of the strips were characterized using optical microscopy, EBSD, TEM and x-ray measurement.

Figure 2:
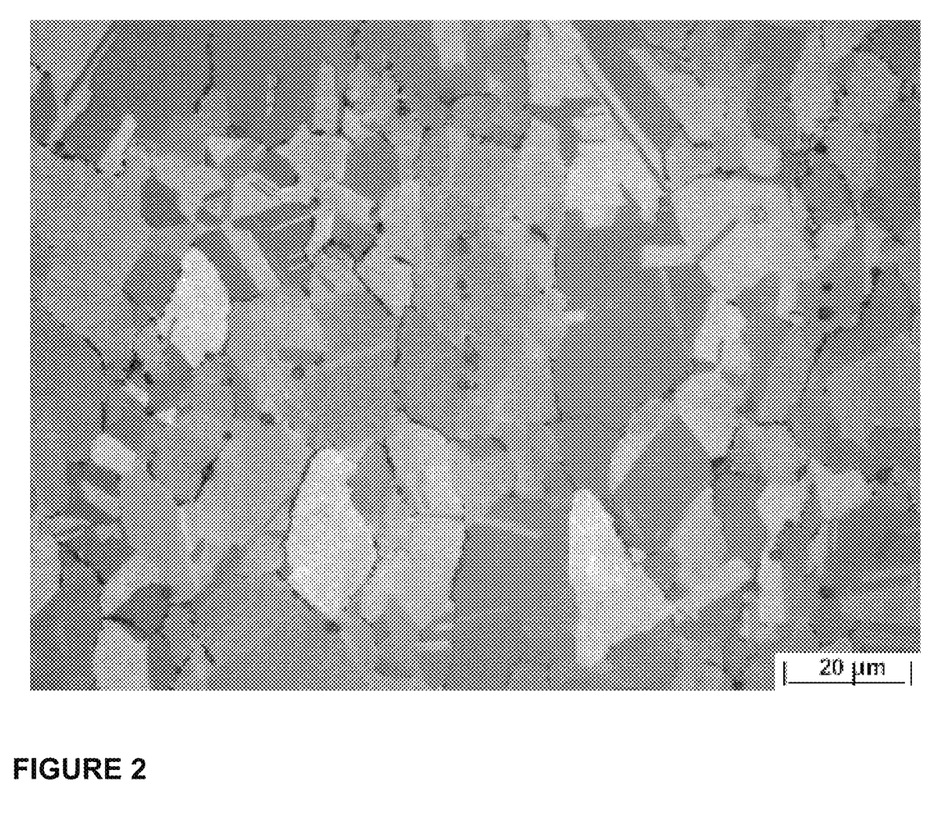
FIG. 2 shows the microstructure of alloy 18 after hot rolling and annealed at 550° C. for 180 min, showing precipitates of intergranular $M_7C_3$-carbide.
Figure 3:
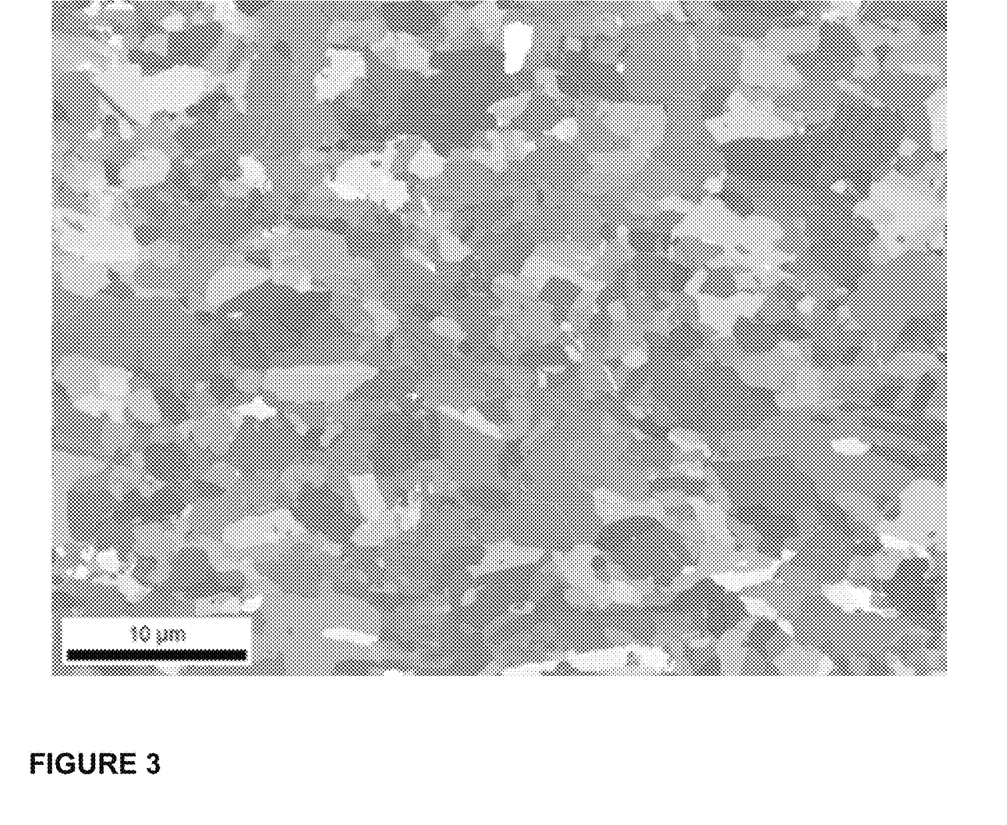
FIG. 3 is a EBSD map of alloy 18 after cold rolling with a reduction of 50% and annealed at 750° C. for 2 min, showing a recrystallized austenitic microstructure with a fine grain size.
Figure 4:
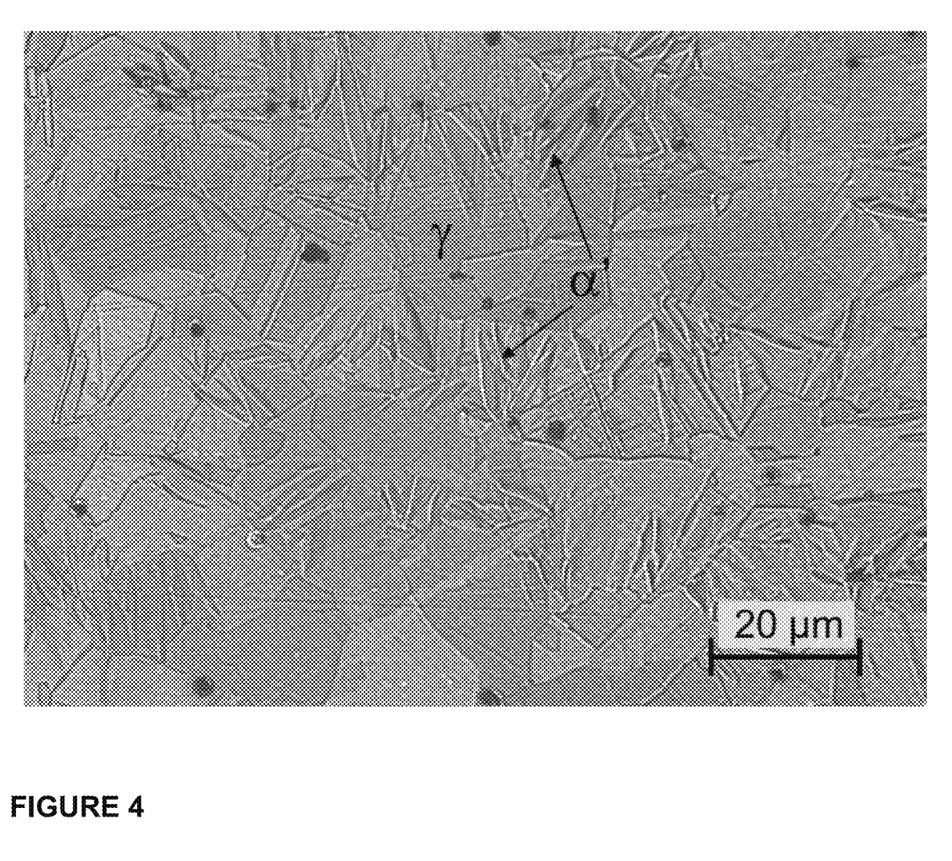
FIG. 4 is the microstructure of alloy 25 solution treated at 1000° C., followed by deep treatment in liquid $N_2$ for 5 min, showing formation of the α' martensite.

The analysis results are also given in Table 2 and Table 3 for the hot rolled strips and the cold rolled strips, respectively. For hot rolled strips, when the annealing temperature is set to below 600° C., a considerable amount of $M_7C_3$ forms along the γ grain boundaries, as shown in FIG. 2 for alloy 18, which is detrimental to ductility. Therefore, an annealing temperature higher than 600° C. should be applied. For cold rolled strips, an annealing temperature higher than 650° C. should be used as the dislocations produced from cold rolling accelerate formation of $M_7C_3$, κ and α. A fine recrystallized austenitic microstructure can be obtained when a proper annealing is conducted, as shown in FIG. 3 for the alloy 18 after cold rolling and annealing at 750° C. for 2 min. This annealing process gives a good property and also fits to the current continuous production line. FIG. 4 shows the microstructure of alloy 25 solution treated at 1000° C. and water quenched to room temperature, followed by deep treatment in liquid $N_2$ for 5 min, showing the formation of the α' martensite. The introduction of the α' martensite in the alloys 25 and 26 can significantly increase the strength.

TABLE 1

The chemical compositions of the steels (in wt %).

| Alloy | Al | Mn | C | Ni | Si | Cu | N | P | S | Cr | Ti | others | Mn/Si |
|---|---|---|---|---|---|---|---|---|---|---|---|---|---|
| 16 | 9.3 | 15.1 | 0.81 | 5.3 | 0.08 | 0.3 | 0.003 | 0.005 | 0.003 | 0.009 | 0.01 | — | 189 |
| 17 | 9.5 | 15.0 | 0.80 | 0.05 | 0.08 | 0.2 | 0.005 | 0.006 | 0.002 | 0.008 | 0.01 | — | 188 |
| 18 | 5.8 | 15.1 | 0.80 | 0.001 | 0.06 | 0.1 | 0.004 | 0.01 | 0.001 | 0.01 | 0.01 | — | 250 |
| 19 | 6.0 | 13.0 | 0.69 | 0.001 | 0.05 | 0.1 | 0.003 | 0.008 | 0.001 | 0.03 | 0.01 | Mo: 0.01 | 260 |
| 25 | 5.7 | 9.9 | 0.79 | 0.002 | 0.06 | 0.17 | 0.004 | 0.003 | 0.002 | 0.05 | 0.002 | V: 0.002 Sn: 0.001 | 165 |
| 26 | 5.8 | 10.3 | 0.72 | 0.003 | 0.05 | 0.16 | 0.005 | 0.005 | 0.002 | 0.01 | 0.002 | Nb: 0.01 Sn: 0.001 | 204 |

TABLE 2

Properties of the hot rolled strips (*= Percentage in area)

| | | Heat treatment | | Tensile properties | | | Microstructures | | | | | |
|---|---|---|---|---|---|---|---|---|---|---|---|---|
| Alloy | Density g/cm³ | HR | Annealing T (° C.)/t (min.) | YS (MPa) | UTS (MPa) | A50 (%) | γ (%*) | α (%*) | κ (%*) | $M_7C_3$ (%*) | M (%*) | Inv. |
| 16 | 6.84 | WQ | | 670 | 960 | 30 | 84 | 16 | — | — | — | no |
| 17 | 6.81 | WQ | | 630 | 923 | 35 | 80 | 21 | — | — | — | yes |
| 18 | 7.21 | WQ | | 569 | 830 | 42 | 100 | — | — | — | — | yes |
| | | | 550/180 | 585 | 845 | 29 | 96.5 | — | 0.5 | 3.0 | — | no |
| | | | 650/5 | 558 | 890 | 41 | 98.8 | 0.5 | 1.0 | — | — | yes |
| | | | 650/120 | 549 | 879 | 42 | 97.6 | 0.8 | 1.6 | — | — | yes |
| 19 | 7.23 | WQ | | 538 | 795 | 43 | 100 | — | — | — | — | yes |
| | | | 550/180 | 559 | 815 | 21 | 95.9 | — | 0.5 | 3.6 | — | no |
| | | | 650/5 | 591 | 855 | 36 | 97.8 | 0.6 | 1.6 | — | — | yes |
| | | | 650/120 | 590 | 846 | 38 | 96.3 | 1.2 | 2.5 | — | — | yes |
| 25 | 7.25 | WQ | | 525 | 778 | 39 | 100 | | | | | yes |
| | | | Liquid $N_2$/5 | 627 | 1060 | 26 | 66 | | | | 34 | no |
| 26 | 7.28 | WQ | | 506 | 756 | 42 | 100 | | | | | yes |
| | | | Liquid $N_2$/5 | 596 | 1036 | 29 | 63 | | | | 37 | no |

TABLE 3

Properties of the cold rolled and annealed sheets (*= Percentage in area)

| | Heat treatment | | Tensile properties | | | | Microstructure | | | | |
|---|---|---|---|---|---|---|---|---|---|---|---|
| Alloy | Annealing T (° C.) | t (min.) | YS (MPa) | UTS (MPa) | A50 (%) | rec/rex | γ (%*) | α (%*) | κ (%*) | $M_7C_3$ (%*) | Inv. |
| 18 | As-cold rolled | | 1465 | 1587 | 2.6 | deformed | 100 | — | — | — | no |
| | 550 | 5 | 1534 | 1673 | 3 | rec | 99.2 | — | — | 0.8 | no |
| | | 30 | 1515 | 1631 | 2 | rec | 98.5 | — | — | 1.5 | no |
| | | 120 | 1465 | 1536 | 1 | rec | 96.5 | — | — | 3.5 | no |

TABLE 3-continued

Properties of the cold rolled and annealed sheets (*= Percentage in area)

| Alloy | Heat treatment | | Tensile properties | | | | Microstructure | | | | Inv. |
|---|---|---|---|---|---|---|---|---|---|---|---|
| | Annealing T (° C.) | t (min.) | YS (MPa) | UTS (MPa) | A50 (%) | rec/rex | γ (%*) | α (%*) | κ (%*) | M₇C₃ (%*) | |
| | 650 | 5 | 1440 | 1545 | 5.5 | rec + rex | 99.3 | 0.5 | 0.2 | — | no |
| | | 30 | 1119 | 1212 | 13.5 | rec + rex | 97.9 | 1.5 | 0.6 | — | no |
| | | 120 | 952 | 1050 | 22 | rec + rex | 95.8 | 2.7 | 1.5 | — | no |
| | 700 | 0.5 | 911 | 1060 | 28.8 | rec + rex | 99.9 | 0.1 | | — | yes |
| | | 1 | 893 | 1044 | 27.4 | rec + rex | 99.8 | 0.2 | | — | yes |
| | | 2 | 845 | 1011 | 29.6 | rec + rex | 99.7 | 0.3 | | — | yes |
| | | 5 | 842 | 1007 | 28.9 | rec + rex | 99.5 | 0.5 | | — | yes |
| | 750 | 2 | 845 | 1025 | 29 | rec + rex | 100 | — | — | — | yes |
| | | 5 | 755 | 970 | 40 | rex | 100 | — | — | — | yes |
| | | 30 | 694 | 935 | 43 | rex | 100 | — | — | — | yes |
| | 800 | 0.5 | 753 | 959 | 39.2 | rex | 100 | — | — | — | yes |
| | | 1 | 736 | 952 | 40.8 | rex | 100 | — | — | — | yes |
| | | 2 | 709 | 941 | 41 | rex | 100 | — | — | — | yes |
| | 850 | 0.5 | 697 | 943 | 42 | rex | 100 | — | — | — | yes |
| 19 | As-cold rolled | | 1433 | 1544 | 0.5 | deformed | 100 | — | — | — | no |
| | 550 | 5 | 1431 | 1576 | 4.5 | rec | 99 | — | — | 1.0 | no |
| | | 30 | 1368 | 1500 | 2.7 | rec | 98.1 | — | — | 1.9 | no |
| | | 120 | 1325 | 1387 | 3 | rec | 96 | — | — | 4.0 | no |
| | 650 | 5 | 1316 | 1418 | 6 | rec + rex | 98 | 1.5 | 0.5 | — | no |
| | | 30 | 1192 | 1256 | 9 | rec + rex | 95.2 | 4 | 0.8 | — | no |
| | | 120 | 1054 | 1105 | 11 | rec + rex | 94 | 5 | 1.0 | — | no |
| | 750 | 2 | 1164 | 1259 | 10.5 | rec + rex | 99.9 | 0.1 | — | — | no |
| | | 5 | 788 | 950 | 31 | rex | 99.6 | 0.4 | — | — | yes |
| | | 30 | 672 | 887 | 39.5 | rex | 99.5 | 0.5 | — | — | yes |

In the figures the following is depicted. FIG. 1 depicts the stacking fault energy (SFE) vs. temperature for several compositions showing the effect of Mn at low temperatures. It indicates that the SFE of alloys 25 (Fe-10Mn-6Al-0.8C and 26 (Fe-10Mn-6Al-0.7C) is lower than 20 mJ/m² at liquid nitrogen temperature. FIG. 2 shows the microstructure of alloy 18 after hot rolling and annealed at 550° C. for 180 min, showing precipitates of intergranular $M_7C_3$-carbide, and FIG. 3 is a EBSD map of alloy 18 after cold rolling with a reduction of 50% and annealed at 750° C. for 2 min, showing a recrystallized austenitic microstructure with a fine grain size. FIG. 4 is the microstructure of alloy 25 solution treated at 1000° C., followed by deep treatment in liquid $N_2$ for 5 min, showing the formation of the α' martensite (sample was etched using Vilella reagent).

The invention claimed is:

1. An austenitic, low-density, high-strength steel strip or sheet having a high ductility, having an element composition consisting of in wt. %:
   0.65-0.9% C;
   0-0.09% Si;
   5.0-20.0% Mn;
   5.5-9.9% Al;
   0.001-0.05% N;
   0.02% or less P;
   0.02% or less S;
   optionally one or more of:
      0.001-0.01% Ca;
      0-0.5% V;
      0.01-0.2% Ti;
      0-0.2% Nb;
      0-0.14% Cr;
      0-0.2% Zr;
      0-2.0% Cu;
      0-0.0050% B;
      0-1.0% Mo;
      0-0.2% Sb;
      the balance Fe with unavoidable impurities,
      having a microstructure comprising 94 to 100 area % of austenite, 6 to 0 area % of ferrite, and 0 to 5 area % of a κ-(Fe,Mn)₃AlC-carbide phase,
      the strip or sheet having a yield ratio YS/UTS of at least 0.60, and a ratio of Mn/Si>40,
      the steel strip or sheet having a density of 6.81 to 7.3g/cm³, a tensile strength of at least 750 MPa and an elongation at a gauge length of 50 mm of at least 25%.

2. The low-density high-strength steel according to claim 1, wherein the molybdenum content is at most 0.04%; and there is 0.01-0.2% Ti; and there is 0.05-2.0% Cu, and the steel strip or sheet density is 6.84 to 7.3 g/cm³.

3. The low-density high-strength steel according to claim 1, wherein carbides other than the γ-(Fe,Mn)₃AlC-carbide are in an amount that is less than 1% in area, and the steel strip or sheet density is 7.0 to 7.3 g/cm³.

4. The low-density high-strength steel according to claim 1, further comprising $M_7C_3$, wherein the $M_7C_3$-carbides have a size that is less than 1 μm in diameter.

5. The low-density high-strength steel according to claim 1, wherein Mn/Si>50.

6. A method for producing an austenitic, low-density, high-strength steel strip or sheet having a high ductility according to claim 1,
having a ratio of Mn/Si>40;
balance iron and unavoidable impurities; wherein Ni is at most an impurity; the method comprising:
producing a thick or thin slab by continuous casting, ingot casting or strip casting;
(re-)heating or homogenising the temperature of the slab, ingot or strip to between 1050 and 1250° C.;
a first hot rolling at a hot-rolling start temperature of more than 1050° C. to a total reduction of higher than 50%
a second hot rolling to the final hot-rolling thickness wherein the finish rolling temperature is higher than 850° C.;
followed by
(1) cooling to a temperature of lower than 200° C. with a cooling rate higher than 1° C./s followed by coiling the strip, or
(2) cooling to a temperature in the range of 450 to 700° C. with a cooling rate higher than 15° C./s followed by coiling the strip and annealing the strip at a temperature between 800 and 1100° C., followed by cooling to a temperature of lower than 200° C. with a cooling rate higher than 1° C./s.

7. The method according to claim 6, wherein Mn/Si>50.

8. The method according to claim 6, wherein the Mo content is at most 0.04%.

9. The method according to claim 6, wherein after the coiling of the hot-rolled steel sheet, the method further comprises:
cold-rolling the coiled steel sheet at a total cold-rolling reduction ratio of 30% to 80%;
after heating the cold-rolled steel sheet at a rate of 1° C./s to 50° C./s to an annealing temperature in a range of higher than 650 to 1100° C., for 5 seconds to 5 hours;
cooling the annealed steel sheet at a rate of 1° C./s to 100° C./s.

10. The method according to claim 6, further comprising plating the steel sheet, on one or each side, with a metallic coating selected from Zn, Zn—Fe, Zn—Al, Zn—Mg, Zn—Al—Mg, Al—Si, and Al—Mg—Si, wherein the thickness of the coating layer or layers is between 10 and 200 μm.

11. A method of use of the steel strip or sheet according to claim 1 comprising producing an automotive part from the steel strip or sheet.

12. An automotive part produced according to claim 11.

13. The low-density high-strength steel according to claim 1, further comprising $M_7C_3$, wherein the $M_7C_3$ is in an amount that is less than 1% in area.

14. The method of claim 11, wherein the producing comprises forming the steel strip or sheet into the automotive part.

15. The low-density high-strength steel according to claim 1, wherein in the steel strip or sheet there is
5.5 to 9.9 wt. % Al,
0.01 to 0.09 wt. % Si,
0 to 0.015 wt. % S,
0.002 to 0.009 wt. % N,
0 to 0.09 wt. % Cr,
0 to 0.09 wt. % Mo,
0 to 0.04 wt. % V,
0 to 0.04 wt. % Nb, and
0 to 0.0030 wt. % B.

16. The low-density high-strength steel according to claim 15, wherein in the steel strip or sheet there is 0.001 to 0.01 wt. % Ca.

17. The low-density high-strength steel according to claim 15, wherein in the steel strip or sheet there is 0.01 to 0.04 wt. % Ti.

18. The method according to claim 6, wherein the steel strip or sheet there is
5.5 to 9.9 wt. % Al,
0.01 to 0.09 wt. % Si,
0 to 0.015 wt. % S,
0.002 to 0.009 wt. % N,
0 to 0.09 wt. % Cr,
0 to 0.09 wt. % Mo,
0 to 0.04 wt. % V,
0 to 0.04 wt. % Nb,
and 0 to 0.0030 wt. % B.

19. The low-density high-strength steel according to claim 15, wherein in the steel strip or sheet there is 0 to 0.06 wt. % Si.

20. The low-density high-strength steel according to claim 1, wherein, in the steel strip or sheet, wherein Cu content is 0.5-2.0 wt. %.

* * * * *